(12) United States Patent
Opris

(10) Patent No.: US 6,225,850 B1
(45) Date of Patent: May 1, 2001

(54) SERIES RESISTANCE COMPENSATION IN TRANSLINEAR CIRCUITS

(76) Inventor: Ion E. Opris, 22421 Walnut Cir. S., #B, Cupertino, CA (US) 95014

( * ) Notice: Subject to any disclaimer, the term of this patent is extended or adjusted under 35 U.S.C. 154(b) by 0 days.

(21) Appl. No.: 09/656,022

(22) Filed: Sep. 6, 2000

Related U.S. Application Data

(62) Division of application No. 09/223,132, filed on Dec. 30, 1998, now Pat. No. 6,121,824.

(51) Int. Cl.[7] ........................................................ G06F 7/44
(52) U.S. Cl. ........................ 327/356; 327/327; 327/539; 323/313
(58) Field of Search ..................... 327/538, 539, 327/355, 356, 357, 358, 359; 323/312, 313, 314, 315

(56) References Cited

U.S. PATENT DOCUMENTS

| | | | | |
|---|---|---|---|---|
| 3,805,092 | * | 4/1974 | Henson | 327/356 |
| 5,151,624 | * | 9/1992 | Stegherr et al. | 327/356 |
| 5,214,321 | * | 5/1993 | Curtis | 327/348 |
| 5,581,210 | * | 12/1996 | Kimura | 327/355 |
| 5,796,243 | * | 8/1998 | Kimura | 323/312 |
| 5,889,665 | * | 3/1999 | Han | 363/60 |

* cited by examiner

Primary Examiner—Kenneth B. Wells
Assistant Examiner—Hai L. Nguyen
(74) Attorney, Agent, or Firm—Fliesler Dubb Meyer & Lovejoy LLP

(57) ABSTRACT

A subcircuit including three bipolar transistors is substituted in place of a single bipolar transistor to achieve extrinsic base and emitter series resistance compensation in translinear circuits. The subcircuit substitution is applied to a Brokaw-type bandgap cell. The subcircuit substitution is applied to a current multiplier circuit, and the resulting circuit is rearranged for external control circuit efficiency. A low-voltage bandgap circuit uses an operational amplifier feedback circuit with bipolar transistors having differing emitter areas and a voltage divider to generate base voltages for a Brokaw-type bandgap cell. A proportional-to-absolute-temperature sensor circuit uses parallel two stacked bipolar transistor paths in which the bipolar transistors' emitter areas are selected to adhere to a relationship so as to provide extrinsic series base and emitter resistance compensation. A proportional-to-absolute-temperature sensor circuit and a bandgap reference circuit use parallel three stacked bipolar transistor paths in which the bipolar transistors' emitter areas are selected to adhere to a relationship so as to provide extrinsic series base and emitter resistance compensation and higher output voltage swings. A bandgap reference circuit has its output referenced to the positive supply voltage, and has stacked current branches in which all transistors have zero base-collector voltages, and are selected to adhere to a relationship so as to provide extrinsic series base and emitter resistance compensation.

8 Claims, 11 Drawing Sheets

SERIES RESISTANCE COMPENSATION IN TRANSLINEAR CIRCUITS

This application is a divisional of Ser. No. 09/223,132, filed Dec. 30, 1998, now U.S. Pat. No. 6,121,824.

BACKGROUND OF THE INVENTION

1. Field of the Invention

The present invention relates to the field of translinear circuits, including current multipliers, bandgap reference circuits, and proportional-to-absolute-temperature sensor circuits. Specifically, the present invention relates to compensation for extrinsic series base and emitter resistance inherent in bipolar transistors within the translinear circuits.

2. Discussion of the Related Art

Proportional-to-absolute-temperature (PTAT) temperature sensors and bandgap reference circuits determine their output values based upon the difference in the voltage drops on diode junctions having different current densities. The primary property exploited by these circuits is the exponential variation of the current density across a p-n junction barrier with the intrinsic voltage applied on that barrier. A larger class of such circuits are the translinear (TL) networks. All the translinear circuits are based on the logarithmic variation of the intrinsic base-emitter voltage of a bipolar transistor with its collector current. There are several sources of errors which limit the accuracy of these translinear circuits. The $V_{BE}$ mismatches in nominal identical pairs due to emitter area differences, process gradients, and mechanical stress, can be minimized by interdigitation and common centroid layouts. The influence of base width modulation by the base-collector voltage (the Early effect) on the collector current can also be minimized by cascode configurations or active biasing for constant $V_{CB}$. Usually, larger errors are due to the finite current gain β and finite base current. These errors are usually minimized by using driver stages or base current cancellation techniques.

Often the limiting factor in the accuracy of translinear circuits comes from the extrinsic base resistance and the series emitter resistance. While their effect is negligible at very low current densities, such as in micropower applications, the errors introduced at even moderate current densities usually dominate the non-idealities in the system. Attempts to compensate the base resistance with other resistors have only a limited success due to the poor matching between the base resistance and the compensation resistor, which also have different temperature coefficients.

A classic example of a translinear circuit is the Brokaw bandgap circuit, shown in FIG. 1. The two bipolar transistors $Q_1$ and $Q_2$ have different emitter areas. Specifically, transistor $Q_2$ is K times larger in emitter area than transistor $Q_1$. The feedback loop including the operational amplifier $A_1$ ensures that the same current I flows through both transistors $Q_1$ and $Q_2$.

Because transistor Q2 is larger in area than transistor Q1, the current densities in the junctions of transistor Q2 are less by a factor of K than the corresponding densities in transistor Q1 when the same total collector current I flows through both transistors. Thus, the voltage drop across the base to emitter p-n junction of transistor Q2 is smaller than the corresponding voltage drop for transistor Q1. The difference in the base-emitter voltage of the two transistors $\Delta V_{be}$ occurs across the resistor $R_1$. The equilibrium value for the bias current I is given by $$I = \frac{\Delta V_{be}}{R_1} \tag{1}$$

where $$\Delta V_{be} = V_{be1} - V_{be2} = \frac{kT}{q} \cdot \ln\left(\frac{I}{I_{sat1}}\right) - \frac{kT}{q} \cdot \ln\left(\frac{I}{I_{sat2}}\right) \tag{2}$$

and kT/q represents the thermal voltage, which is proportional to absolute temperature T measured in Kelvin degrees. Since Q1 and Q2 have emitter areas ratioed by a factor of K, $I_{sat2} = K \cdot I_{sat1}$, and eq. (2) reduces to the following $$\Delta V_{be} = \frac{kT}{q} \cdot \ln(K) \tag{3}$$

The output voltage $V_{BG}$ in FIG. 1, can be expressed as follows.

$$V_{BG} = V_{be2} + \frac{R_1 + 2R_2}{R_1} \cdot \Delta V_{be} \tag{4}$$

For a certain ratio of the resistors $R_1$ and $R_2$, $V_{BG}$ becomes equal to the bandgap voltage, and it is essentially temperature independent. Importantly, the cancellation of the output voltage temperature dependence is obtained independently of the absolute value of the resistors $R_1$ and $R_2$, which is difficult to control.

Eq. (2) assumes an ideal behavior for the bipolar transistor and neglects the voltage drops on the emitter and base extrinsic series resistors. The extrinsic base-emitter voltage of a transistor can be expressed as follows.

$$V_{be} = \frac{kT}{q} \cdot \ln\left(\frac{I}{I_{sat}}\right) + I \cdot R_e + \frac{I}{\beta + 1} \cdot R_b \tag{5}$$

In the above equation, $R_e$–is the emitter series resistance, $R_b$–is the base series resistance, β–is the dc current gain, and I/(β+1) is the base current.

For many applications, such as temperature sensors and low-noise bandgap references, the current densities are large enough so the series resistance voltage drops (the last two terms in eq. (5)) become significant. The equilibrium bias current in this case can be calculated from $$I = \frac{\frac{kT}{q} \cdot \ln(K)}{R_1 - R_e \cdot \left(1 - \frac{1}{K}\right) - \frac{R_b}{\beta + 1} \cdot \left(1 - \frac{1}{K}\right)} \tag{6}$$

In eq. (6), it is assumed that the series resistances $R_b$ and $R_e$ are inversely proportional to the emitter area, such that $$R_{e2} = \frac{R_{e1}}{K} = \frac{R_e}{K} \tag{7}$$

$$R_{b2} = \frac{R_{b1}}{K} = \frac{R_b}{K} \tag{8}$$

In practice, the resistor $R_1$ is technologically different from internal resistors $R_b$ and $R_e$, and they have different temperature coefficients. In particular, it is very hard to control the ratio of these internal resistances to the other resistors in the circuit $R_1$ and $R_2$. For a PTAT current source, even though $R_1$ can be made with a zero temperature coefficient (zero TC), the errors due to the extra terms in eq. (6) introduce errors in the ideal PTAT variation. In particular, the $\Delta V_{be}$ voltage drop variation between the two junctions with different current densities is not PTAT any longer, but includes a term dependent on the ratio of resistors $R_b$, $R_e$ and $R_1$.

$$V_{be} = \frac{kT}{q} \cdot \ln(K) + \frac{kT}{q} \cdot \ln(K) \cdot \frac{\left(R_e + \frac{R_b}{\beta+1}\right) \cdot \left(1 - \frac{1}{K}\right)}{R_1 - \left(R_e + \frac{R_b}{\beta+1}\right) \cdot \left(1 - \frac{1}{K}\right)} \qquad (9)$$

Conventional ways to circumvent this problem in PTAT temperature sensors have been proposed by using three different current densities and then to compensate for the IR drops using complicated computations, which are inherently undesirable due to their significant complexity.

SUMMARY OF THE INVENTION

Conventional circuits for extrinsic base and emitter series resistance compensation suffer from the flaw the compensation resistor has a different temperature coefficient than the extrinsic base and emitter resistances because of the different fabrication and structural composition of the compensation resistor and the extrinsic base and emitter resistances. Therefore, conventional circuits are unable to robustly compensate for the extrinsic resistances of the bipolar transistor over all operating conditions. An object of the present invention is to provide a general purpose extrinsic base and emitter series resistance compensation circuit effective in any translinear circuit. Another object of the present invention is to provide proportional-to-absolute-temperature sensor circuits and bandgap reference circuits which effectively compensate for the extrinsic base and emitter series resistances under all operating conditions.

According to an embodiment of the present invention, a bandgap reference circuit is constructed in which the bases of the two bipolar transistors coupled to the inputs of the operational amplifier which produces the bandgap output are driven by voltages which are elevated by amounts which perfectly compensate for the voltage drops across the extrinsic base and emitter series resistances of those transistors. A feedback loop driven by the bandgap output voltage forces a fixed current through a voltage divider. The ratio of the resistances of the resistors in the voltage divider are chosen as a function of the emitter area multiple of the two bipolar transistors coupled to the inputs of the operational amplifier which produces the bandgap output. Because this embodiment has relatively few elements between the positive supply and ground, this embodiment is suitable for low-voltage operation.

According to another embodiment of the present invention, a proportional-to-absolute-temperature sensor circuit is constructed in which two parallel current paths each contain two stacked series transistors. The emitter areas of the four transistors are chosen so that the extrinsic series resistances through the two parallel current paths are equal and therefore cancel each other. Preferred implementations of the embodiments described involve whole number multiples of the emitter areas using unit transistors so that correct area ratios can be precisely controlled. Because this embodiment has relatively few elements between the positive supply and ground, this embodiment is suitable for low-voltage operation.

According to yet another embodiment of the present invention, a proportional-to-absolute-temperature sensor circuit is constructed in which two parallel current paths each contain three stacked series transistors. The emitter areas of the six transistors are chosen so that the extrinsic series resistances through the two parallel current paths are equal and therefore cancel each other. The embodiments having more elements between the positive supply and ground require relatively higher supply voltages, but provide the capacity for larger output voltage dynamic swing.

According to still another embodiment of the present invention, a bandgap reference circuit is constructed in which two parallel current paths each contain three stacked series transistors. The emitter areas of the six transistors are chosen so that the extrinsic series resistances through the two parallel current paths are equal and therefore cancel each other. Extrinsic series resistance compensation is accomplished on a separate loop which produces the bandgap reference output by tapping the base voltage of one of the middle transistors in the three stack.

According to yet still another embodiment of the present invention, a bandgap reference circuit references its output voltage to the positive supply. One current path contains three stacked series transistors, while another parallel current path includes one transistor in series with two parallel sub-branches. One sub-branch includes two stacked series transistors, while the other sub-branch includes a single transistor and includes the bandgap reference output feedback loop. The emitter areas in the two sub-branches are chosen so that the extrinsic series resistances through the two sub-branches are equal. The emitter area of the single transistor in the parallel current path is chosen so that the total extrinsic series resistance through the parallel current path equals the total extrinsic series resistance through the current path containing three stacked series transistors. Because all transistors in this embodiment have zero base-collector voltages, errors associated with base width modulation are also eliminated.

An aspect of the present invention includes an equivalent subcircuit which may be substituted in any translinear circuit for a single transistor to compensate for the extrinsic series base and emitter resistances inherent in the single transistor. Three transistors are connected so that the base to emitter voltages of two of the transistors add while the third transistor's base to emitter voltage subtracts when the three transistors are substituted for the single transistor. The emitter areas of the two transistors whose base to emitter voltages add are chosen so that their series extrinsic resistance is equal to the extrinsic resistance of the third transistor which subtracts. Thereby, the total voltage drop due to extrinsic series resistance of the three transistors is zero when equal collector currents are driven through each of the transistors.

According to a further embodiment of the present invention, the equivalent subcircuit is substituted in the conventional Brokaw bandgap reference circuit to produce a bandgap reference circuit having extrinsic series resistance compensation.

According to yet a further embodiment of the present invention, a current multiplier subcircuit is substituted in a conventional bandgap reference circuit to produce a bandgap reference circuit having extrinsic series resistance compensation.

According to yet still a further embodiment of the present invention, the current multiplier subcircuit of the yet a further embodiment is rearranged to minimize bias and control circuitry and yet still provide extrinsic series resistance compensation.

These and other features, aspects, and advantages of the present invention are thoroughly disclosed by the Figures as described in the Detailed Description of the Invention.

The Figures are more thoroughly discussed in the Detailed Description of the Invention.

DETAILED DESCRIPTION OF THE INVENTION

Conventional methods to provide extrinsic series base and emitter compensation are either inaccurate over differing operating conditions or involve complicated digital computations to provide adequate compensation. The present invention includes several circuit solutions which accurately provide extrinsic series base and emitter resistance compensation regardless of temperature.

Figure 2:
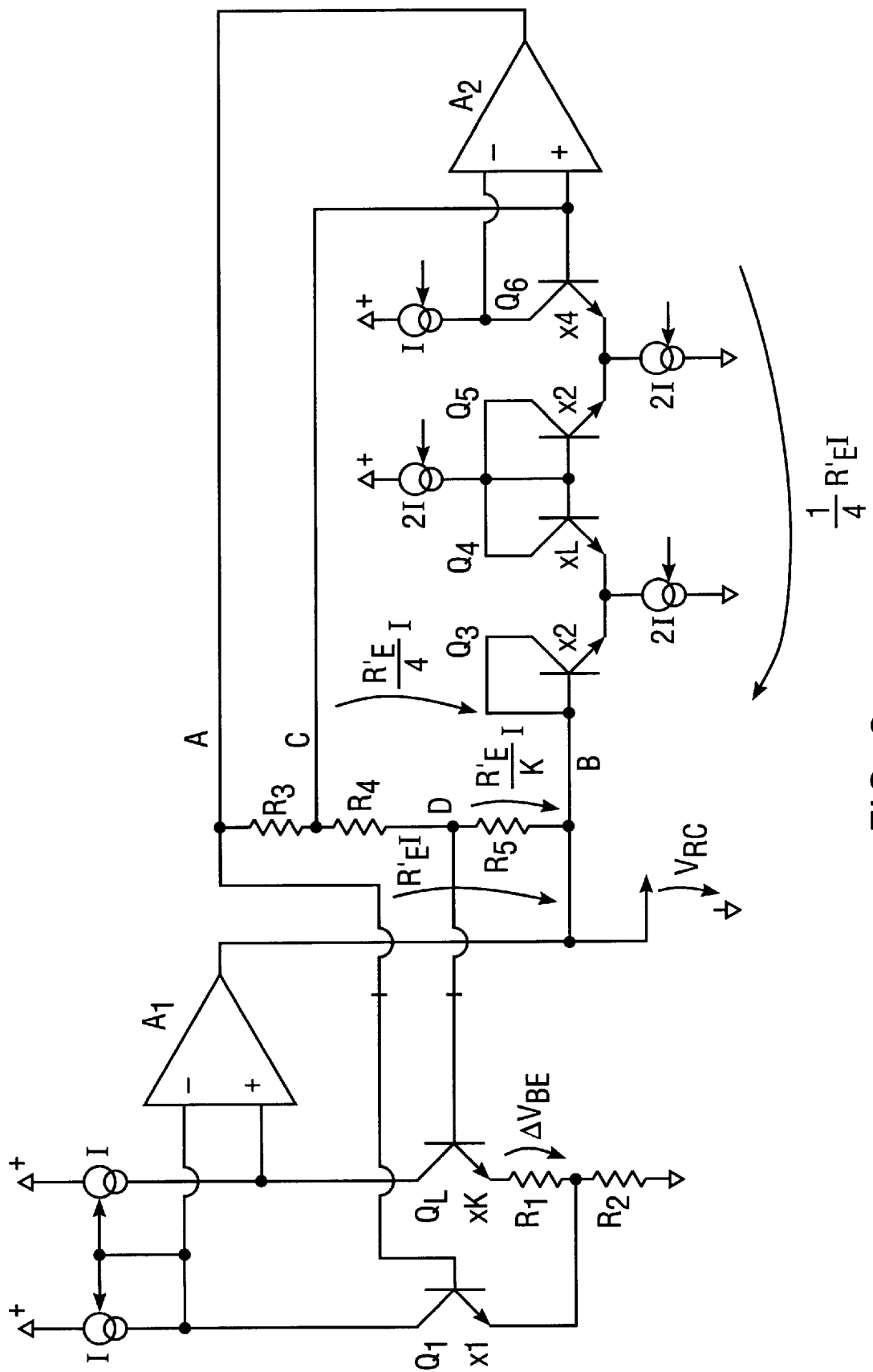
FIG. 2 illustrates a bandgap reference circuit suitable for low voltage use according to an embodiment of the present invention.

The first proposed circuit solution is shown in FIG. 2. The circuit is a variant of the Brokaw circuit previously discussed. The major difference consists in the fact that the bases of bipolar transistors $Q_1$ and $Q_2$ are not connected together to the output (point B). A separate loop, consisting of bipolar transistors $Q_3$–$Q_5$, the operational amplifier $A_2$, and the current sources I and 2I (also servo-ed from the main bias current I) force a small voltage drop between the points B and C. Since this secondary loop forces equal bias currents I (equal to the main bias current I) through each of the transistors $Q_3$–$Q_6$, with the emitter areas indicated, the equilibrium voltage drop between points C and B is as follows.

$$V_{CB}=V_{be3}-V_{be4}+V_{be5}-V_{be6} \tag{10}$$

Using eq. (5) with the appropriate area ratioed values for $I_{sat}$, $R_b$ and $R_e$, eq. (10) becomes the following.

$$V_{CB} = \frac{1}{4} \cdot \left(R_e + \frac{R_b}{\beta+1}\right) \cdot I \tag{11}$$

The assumption used in eq. (11) was that the current gain $\beta$ is the same for all bipolar devices, which is a very good approximation in practice since these devices operate at comparable current densities. The voltage drop $V_{BC}$ is actually obtained from a resistor divider $R_4+R_5$ and $R_3$ from the $V_{AB}$ voltage drop. By a proper ratio of these resistors, the voltage drops $V_{AB}$ and $V_{DB}$ are forced to be as follows.

$$V_{AB} = \frac{R_3+R_4+R_5}{R_4+R_5} \cdot V_{CB} = \left(R_e + \frac{R_b}{\beta+1}\right) \cdot I \tag{12}$$

$$V_{DB} = \frac{R_5}{R_4+R_5} \cdot V_{CB} = \frac{1}{K} \cdot \left(R_e + \frac{R_b}{\beta+1}\right) \cdot I \tag{13}$$

These values for $V_{AB}$ and $V_{DB}$ are exactly the extra IR drops in the extrinsic $V_{be}$ drop (eq. 5) for the two transistors $Q_1$ and $Q_2$. Therefore, the initial circuit, with $Q_1$, $Q_2$, the current mirror I, and the op amp $A_1$ behaves as if the bipolar devices $Q_1$ and $Q_2$ would have ideal base-emitter voltages $V_{be}$. Therefore, the difference $\Delta V_{be}$ shown in FIG. 2 is PTAT and the output voltage $V_{BG}$ is equal to the ideal bandgap (eq. 4), both independent of the series resistors $R_b$ and $R_e$.

Figure 3:
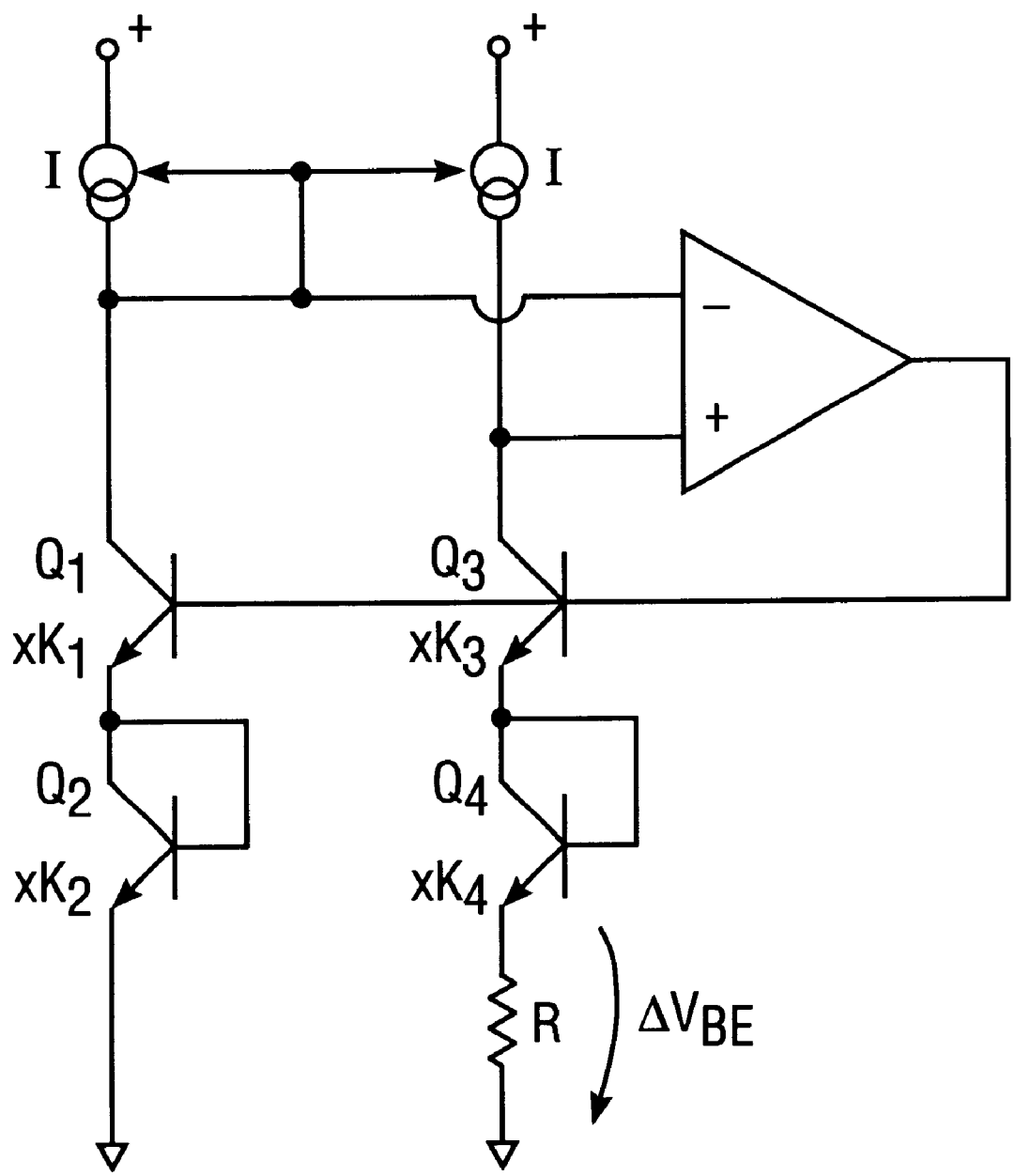
FIG. 3 illustrates a proportional-to-absolute-temperature sensor circuit suitable for low voltage according to another embodiment of the present invention.

It is noteworthy that the secondary loop works correctly if the IR drops are significantly higher than random $V_{BE}$ mismatches, and this is exactly the regime requiring IR voltage drops compensation. A simpler circuit to generate a PTAT (or current, with a zero TC resistor) is shown in FIG. 3. The IR voltage drops in the bipolar transistors $Q_1$–$Q_4$ are cancelled if the following relation is satisfied (since all the IR drops are inversely proportional to emitter area).

$$\frac{1}{K_1} + \frac{1}{K_2} = \frac{1}{K_3} + \frac{1}{K_4} \tag{14}$$

If the above relation holds, the $\Delta V_{be}$ voltage is ideally PTAT, and the following relationship is true.

$$\Delta V_{be} = \frac{kT}{q} \cdot \ln\left(\frac{K_3 \cdot K_4}{K_1 \cdot K_2}\right) \tag{15}$$

An example of emitter areas satisfying (14) is $K_1=4$, $K_2=6$, $K_3=12$, $K_4=3$. Other combinations are also possible.

Figure 4:
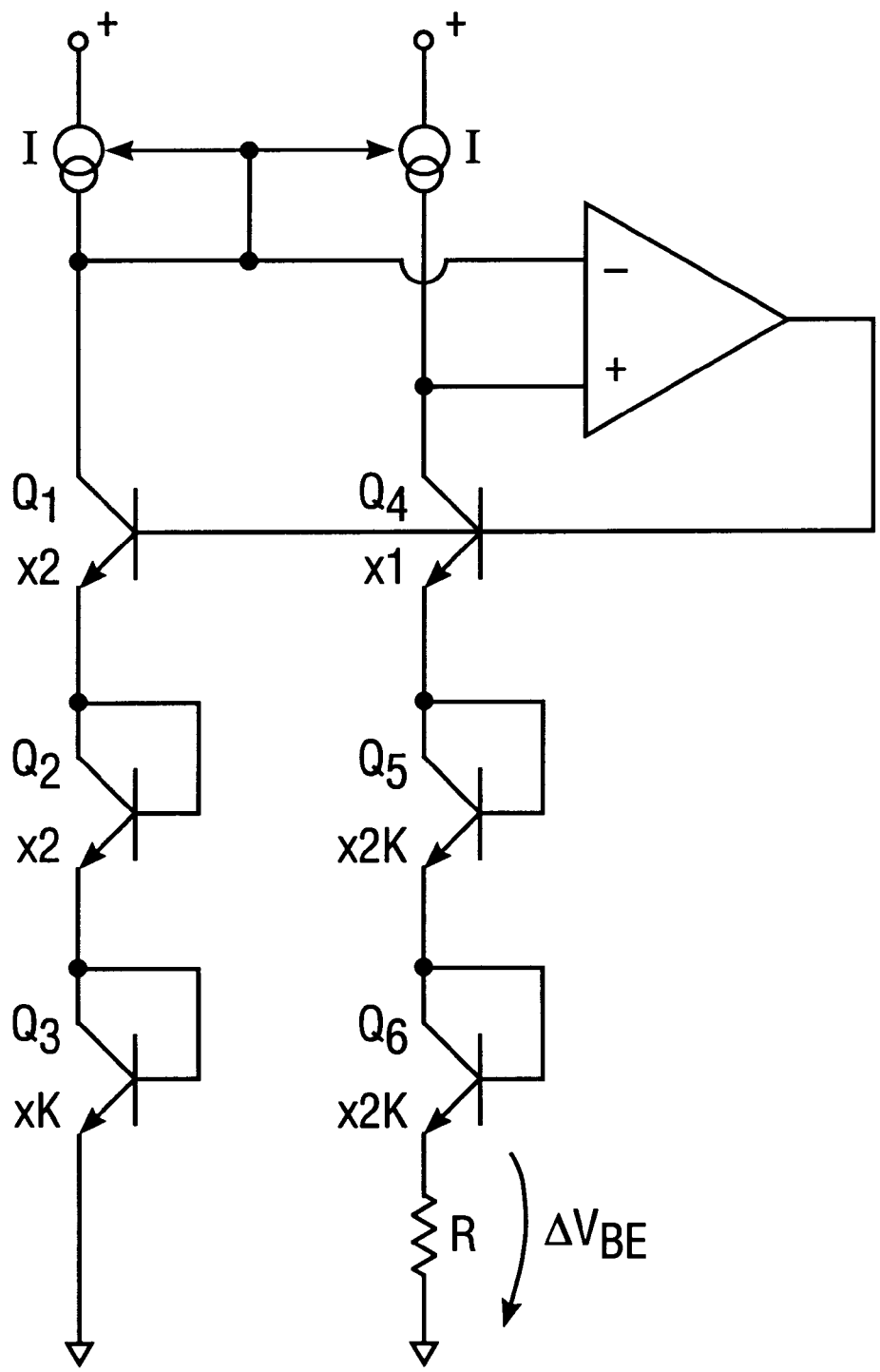
FIG. 4 illustrates a proportional-to-absolute-temperature sensor circuit having increased output voltage range according to yet another embodiment of the present invention.

Another variation of the present invention is the circuit in FIG. 4. The advantage of this circuit is that it can develop larger $\Delta V_{be}$ voltages. A detailed analysis follows, using the emitter area ratios indicated.

$$\Delta V_{be}=V_{be1}+V_{be2}+V_{be3}-V_{be4}-V_{be5}-V_{be6} \tag{16}$$

$$V_{be1} = V_{be2} = \frac{kT}{q} \cdot \ln\left(\frac{I}{2 \cdot I_{sat}}\right) + I \cdot \frac{R_e}{2} + \frac{I}{\beta+1} \cdot \frac{R_b}{2} \tag{17}$$

-continued $$V_{be3} = \frac{kT}{q} \cdot \ln\left(\frac{I}{K \cdot I_{sat1}}\right) + I \cdot \frac{R_e}{K} + \frac{I}{\beta+1} \cdot \frac{R_b}{K} \quad (18)$$

$$V_{be4} = \frac{kT}{q} \cdot \ln\left(\frac{I}{I_{sat1}}\right) + I \cdot R_e + \frac{I}{\beta+1} \cdot R_b \quad (19)$$

$$V_{be5} = V_{be6} = \frac{kT}{q} \cdot \ln\left(\frac{I}{2K \cdot I_{sat1}}\right) + I \cdot \frac{R_e}{2K} + \frac{I}{\beta+1} \cdot \frac{R_b}{2K} \quad (20)$$

Substituting equations (17)–(20) into eq. (16) yields the following.

$$\Delta V_{be} = \frac{kT}{q} \cdot \ln(K) \quad (21)$$

Thus, the result is independent of the IR drops. Of course, other emitter ratios are also possible in order to obtain a perfect IR drop cancellation.

Figure 5:
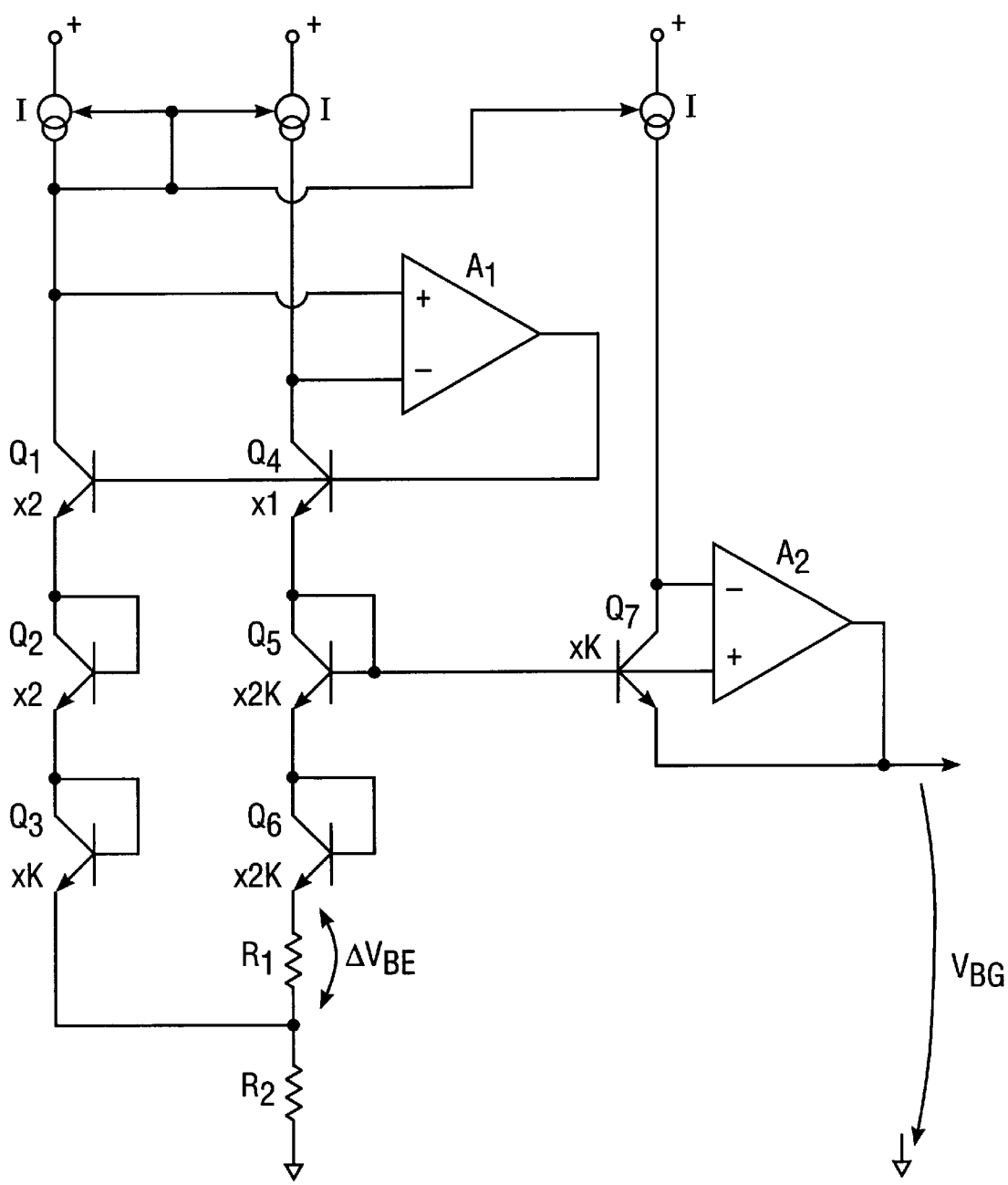
FIG. 5 illustrates a bandgap reference circuit having increased output voltage range according to still another embodiment of the present invention.

Because of the three stacked transistors, this circuit requires larger supply voltages, but also enables the IR drops cancellation on an additional loop, as shown in FIG. 5, to obtain an IR drop independent bandgap circuit. The extra bipolar transistor $Q_7$ has the same collector current as the other two branches through the feedback loop with the op amp $A_2$ detailed analysis confirms a perfect IR drop cancellation in the output voltage as follows.

$$V_{BG} = \frac{R_1}{R_1 + R_2} \cdot \Delta V_{be} + V_{be5} + V_{be6} - V_{be7} \quad (22)$$

Using eq. (18)–(20) the output voltage can be expressed as follows.

$$V_{BG} = \frac{R_1}{R_1 + R_2} \cdot \Delta V_{be} + \frac{kT}{q} \cdot \ln\left(\frac{I}{4K \cdot I_{sat}}\right) \quad (23)$$

Equation (23) is in the same form as equation (4). The bandgap voltage is independent of the IR voltage drops and its value and temperature coefficient are dependent only on the ratio of the resistors $R_1$ and $R_2$.

Figure 6:
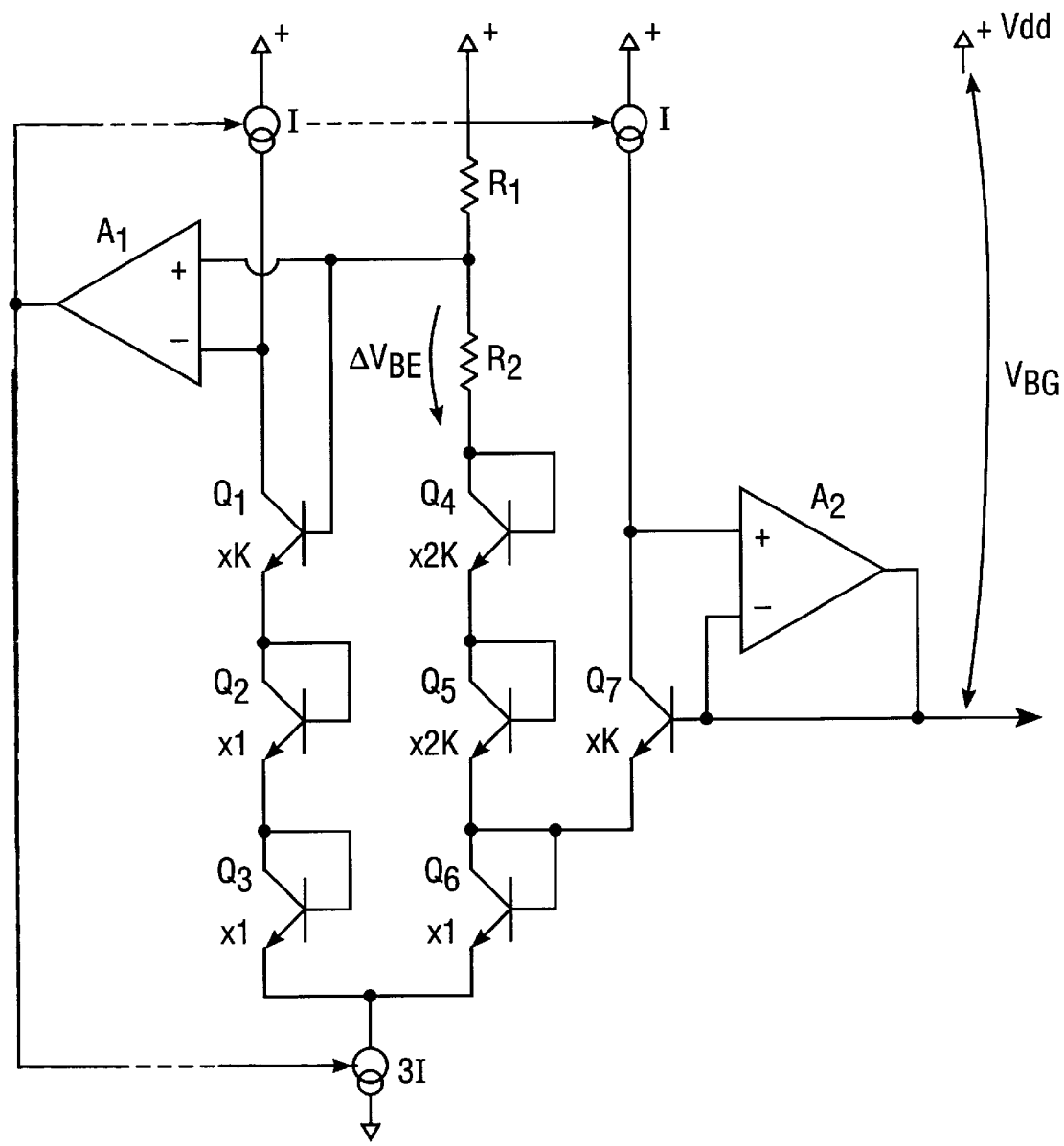
FIG. 6 illustrates a bandgap reference circuit having its output voltage referenced to the positive supply according to yet still another embodiment of the present invention.

Another implementation of the circuit in FIG. 5 is the bandgap circuit in FIG. 6. The output voltage is referenced in this case to the supply rail. Similar analysis as above shows a perfect IR drop cancellation in the output voltage and the bias circuit I. Another advantage of this implementation is the fact that all the bipolar transistors $Q_1$–$Q_7$ are biased with zero base-collector voltage, thus reducing the errors associated with the base width modulation (the Early effect).

The voltage drop on the emitter extrinsic series resistance is usually much lower than the term including the base resistance. The two terms can be actually lumped together as long as the current gain factor $\beta$ remains constant by defining an equivalent series resistance. This is a fairly reasonable assumption for quality bipolar transistors that maintain a constant current gain for many decades in current density. This simplified analysis also neglects other second order effects, such as the lowering of the effective base resistance at high current densities due to emitter current crowding.

It is straightforward that the errors due to the series resistors in the translinear loops are eliminated if all the iR drops cancel on the loop. The compensation method according to the present invention uses additional devices on TL loops such that the original devices current densities are maintained while the series resistors voltage drops are canceled. A basic assumption is that the equivalent series resistance is inversely proportional to the transistor multiplicity factor. This assumption is based on the good practice of making integer multiplicity devices from matched transistors connected in parallel. Since the voltage drops on the series resistors are cancelled, the equivalent base-emitter voltage has no error terms.

Figure 7:
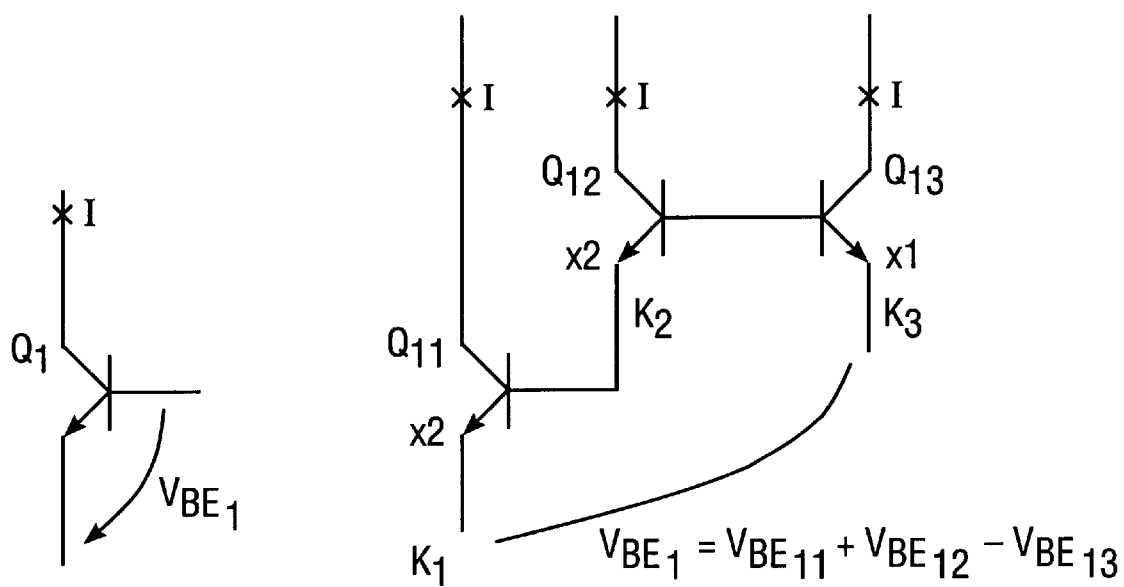
FIG. 7 illustrates an equivalent subcircuit for substituting in place of a single transistor to achieve extrinsic base and emitter series resistance compensation in any translinear circuit according to a translinear equivalence aspect of the present invention.

The same technique can be applied to any translinear circuit. FIG. 7 presents a general equivalence. The transistor $Q_1$ is replaced by the combination $Q_{11}$–$Q_{13}$ and auxiliary circuitry that ensures the same collector current for all these transistors. In this case the equivalent base-emitter voltage is given by the following.

$$V_{be1} = V_{be11} + V_{be12} - V_{be13} \quad (24)$$

Assuming series resistances inversely proportional to the emitter area, this equivalent base-emitter voltage is independent of IR voltage drops.

$$\Delta V_{be} = \frac{kT}{q} \cdot \ln\left(\frac{I}{4 \cdot I_{sat}}\right) \quad (25)$$

Figure 1:
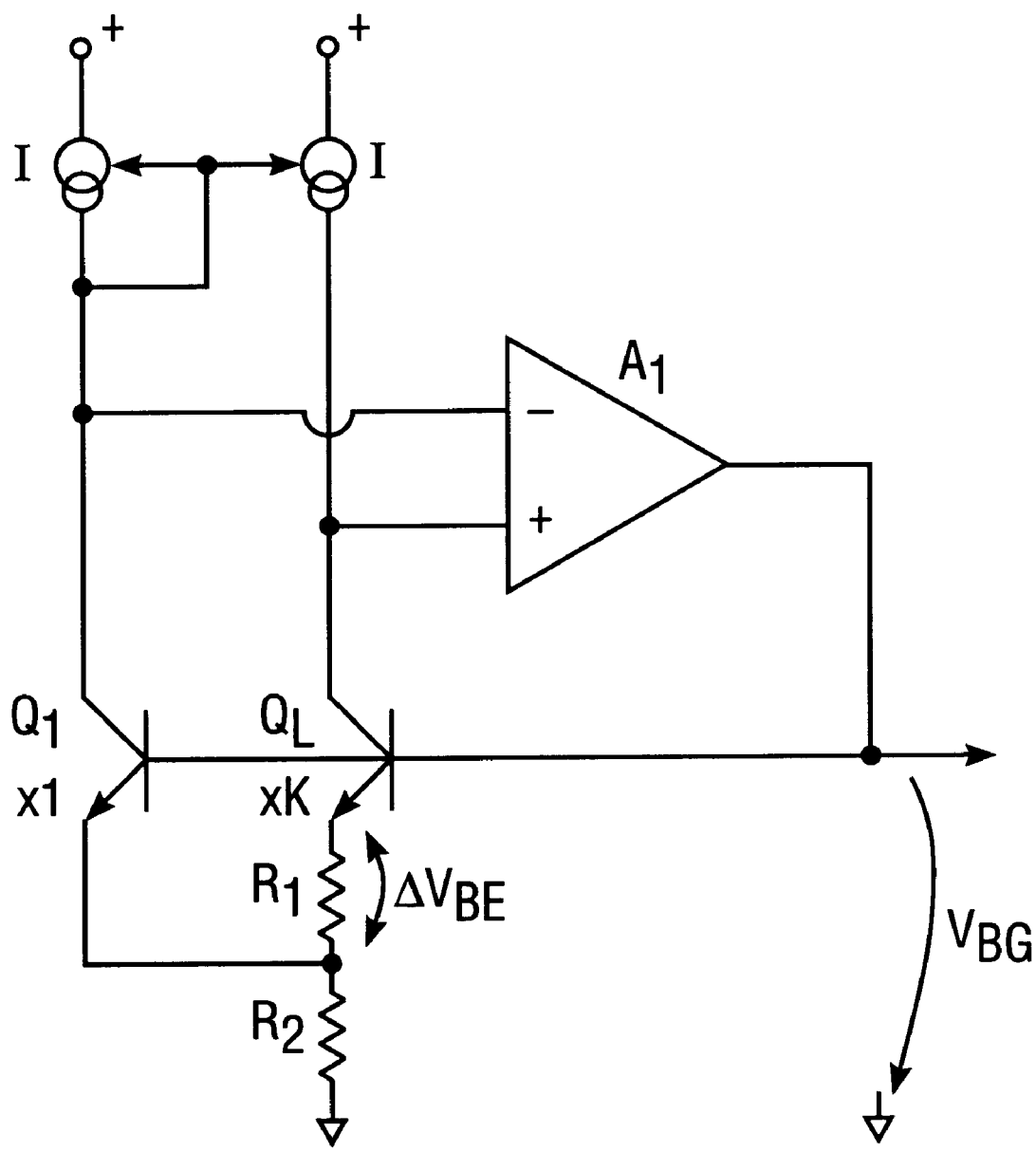
FIG. 1 illustrates a conventional bandgap reference circuit.
Figure 8:
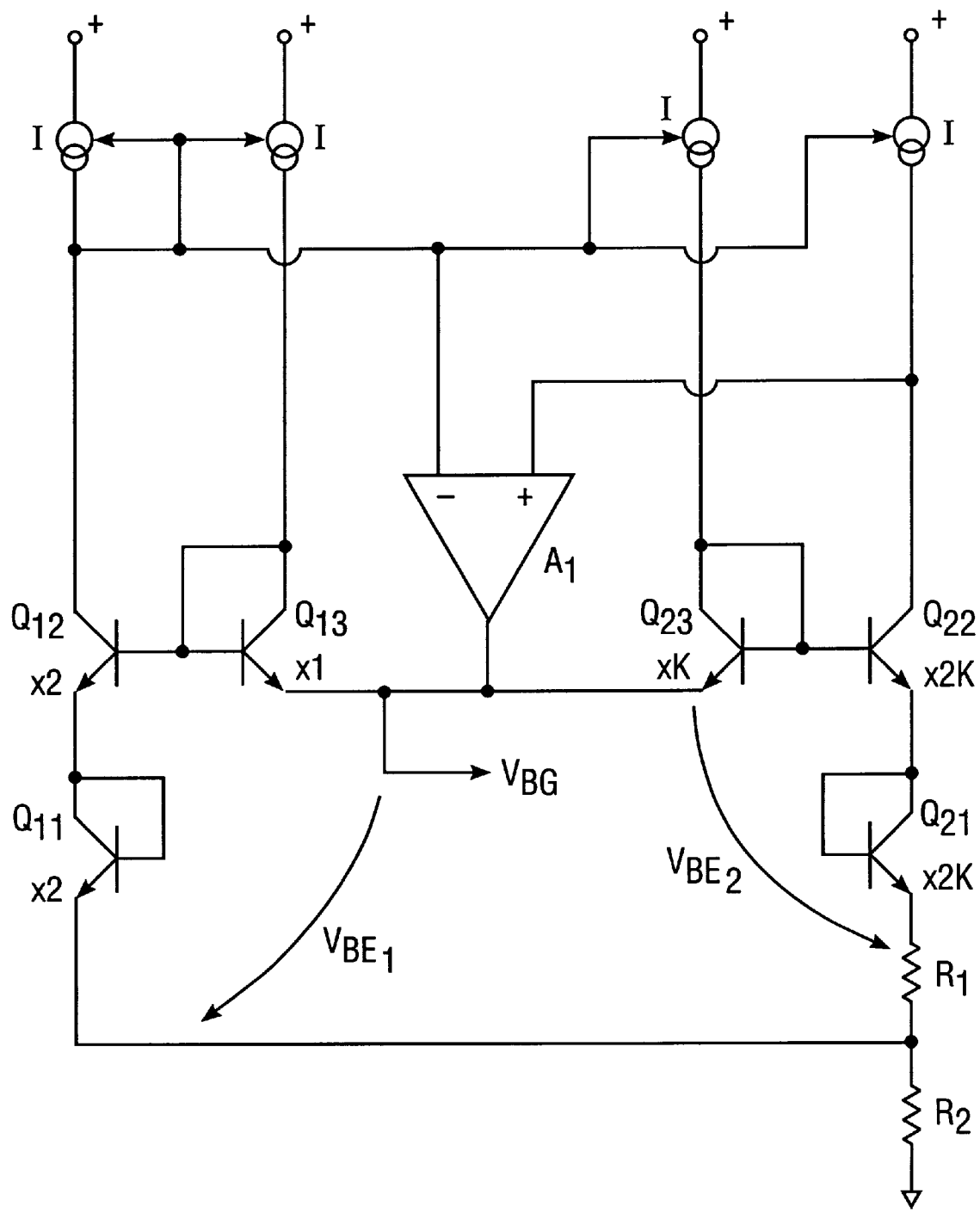
FIG. 8 illustrates a bandgap reference circuit according to a further embodiment of the present invention using the translinear equivalence aspect of the present invention.

The application of this technique to a bandgap reference circuit is shown in FIG. 8. In this case, the transistors $Q_1$ and $Q_2$ in the circuit in FIG. 1 were replaced by the $Q_{11}$–$Q_{13}$ and $Q_{21}$–$Q_{23}$ groups. Otherwise, the functionality of this circuit is the same as for the circuit in FIG. 1. However, for the circuit in FIG. 8, all the IR voltage drops due to the extrinsic series base and emitter resistors are cancelled.

Figure 9:
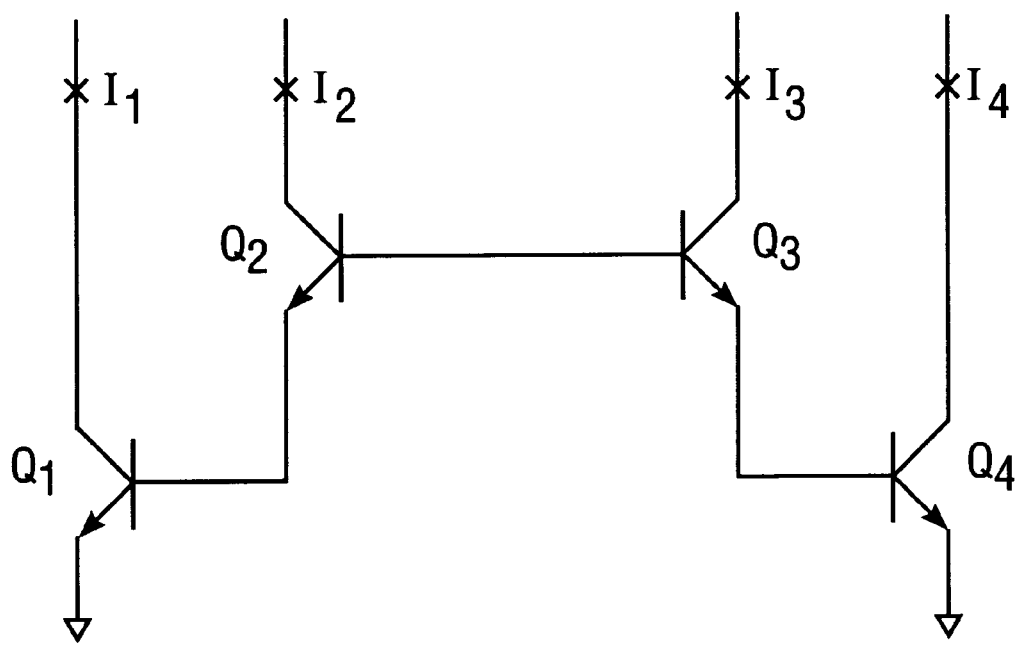
FIG. 9 illustrates a conventional current multiplier subcircuit.

As yet another example, the multiplier cell in FIG. 9 was considered. The base-emitter voltages on the loop satisfy the following relation.

$$V_{be1} + V_{be2} = V_{be3} + V_{be4} \quad (26)$$

If all the IR drops are ignored and $Q_1$–$Q_4$ are matched devices at the same temperature, eq. (26) implies $$I_1 \cdot I_2 = I_3 \cdot I_4 \quad (27)$$

Figure 10:
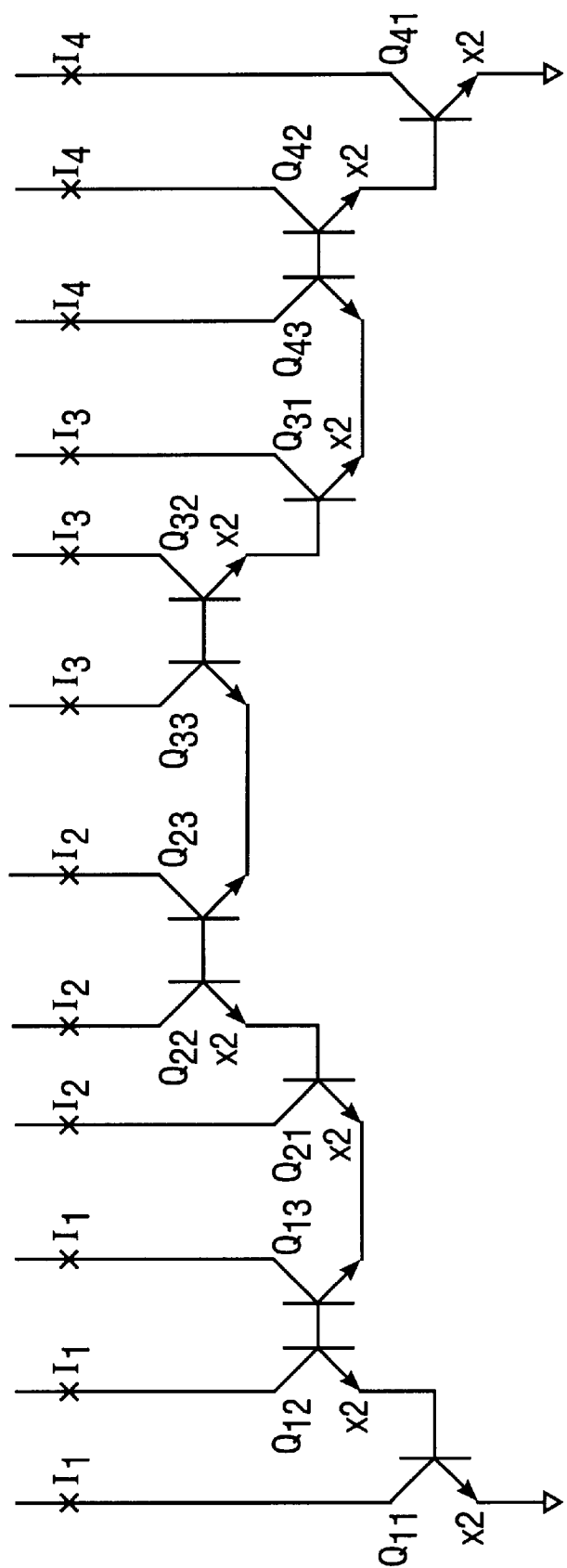
FIG. 10 illustrates a current multiplier subcircuit according to yet a further embodiment of the present invention using the translinear equivalence aspect of the present invention.
Figure 11:
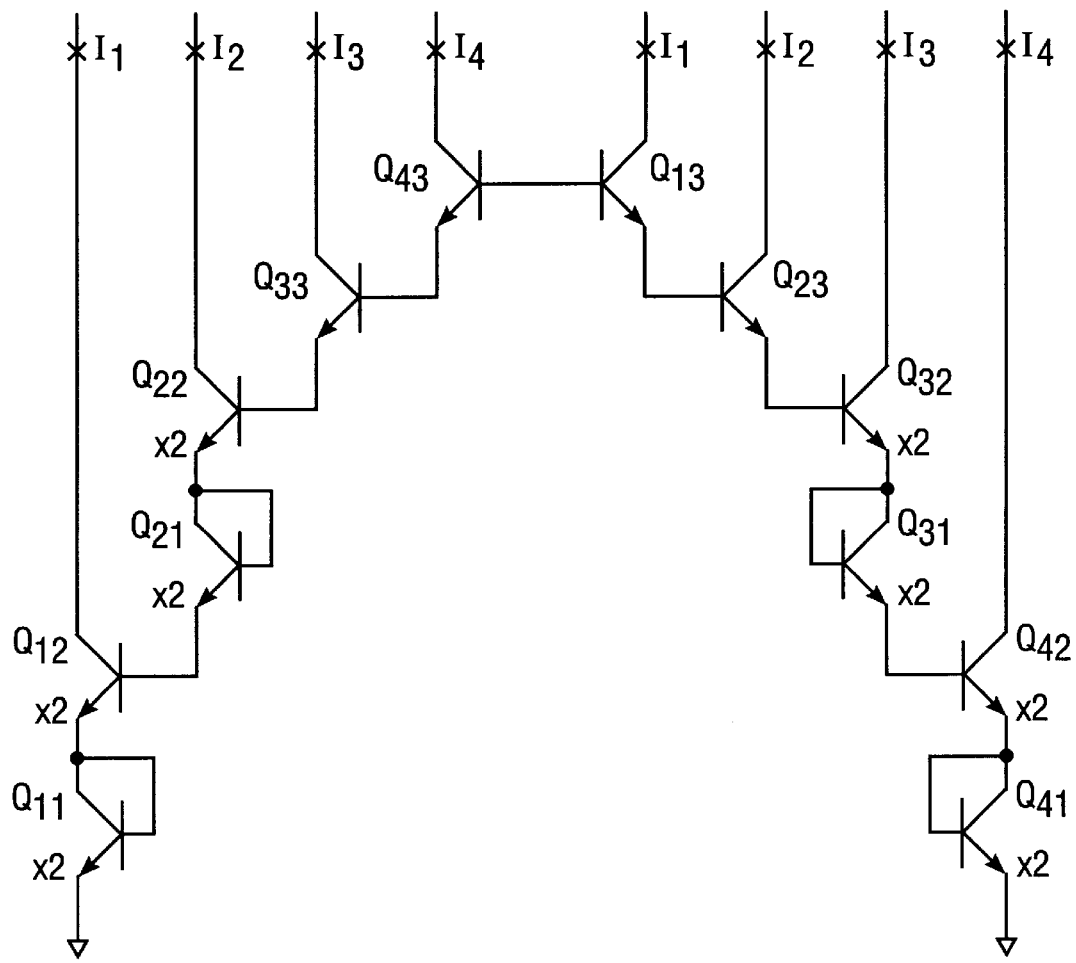
FIG. 11 illustrates a current multiplier subcircuit according to yet still a further embodiment of the present invention.

Errors will result if the more precise expression (5) is used for the $V_{be}$. Those errors are cancelled in the multiplier circuits proposed in FIG. 10 and 11. Both these configurations are based on the equivalence presented in FIG. 7, and the series resistance compensation is achieved by increasing the circuit's complexity and the auxiliary circuitry to maintain the indicated current through all the branches.

For certain applications, such as PTAT temperature sensors and low noise bandgap reference circuits, conventionally the IR voltage drops on the series resistance in the emitter and the base of the reference transistors can lead to important non-linearities (temperature sensors) and process dependent temperature coefficient (bandgap circuits). The present invention discloses circuit techniques for perfect cancellation of the IR voltage drops. By using these techniques, a PTAT voltage (current) can be used in a temperature sensor without any trimming. Several circuit topologies for bandgap circuits are also disclosed. The technique according to the present invention can be generalized to any translinear circuit, such as a precision multiplier.

While the present invention has been described in conjunction with several alternative embodiments, these embodiments are offered by way of illustration rather than by way of limitation. Those skilled in the art will be enabled by this disclosure to make various modifications and alterations to the embodiments described without departing from the spirit and scope of the present invention. Accordingly, these modifications and alterations are deemed to lie within the spirit and scope of the present invention as specified by the appended claims.

What is claimed is:

1. A current multiplier, comprising:

a first first bipolar transistor having a first first collector, a first first base, and a first first emitter occupying a first first emitter area;

a first second bipolar transistor having a first second collector, a first second base, and a first second emitter occupying a first second emitter area;

a first third bipolar transistor having a first third collector, a first third base, and a first third emitter occupying a first third emitter area;

a second first bipolar transistor having a second first collector, a second first base, and a second first emitter occupying a second first emitter area;

a second second bipolar transistor having a second second collector, a second second base, and a second second emitter occupying a second second emitter area;

a second third bipolar transistor having a second third collector, a second third base, and a second third emitter occupying a second third emitter area;

a third third bipolar transistor having a third third collector, a third third base, and a third third emitter occupying a third third emitter area;

a third second bipolar transistor having a third second collector, a third second base, and a third second emitter occupying a third second emitter area;

a third first bipolar transistor having a third first collector, a third first base, and a third first emitter occupying a third first emitter area;

a fourth third bipolar transistor having a fourth third collector, a fourth third base, and a fourth third emitter occupying a fourth third emitter area;

a fourth second bipolar transistor having a fourth second collector, a fourth second base, and a fourth second emitter occupying a fourth second emitter area; and a fourth first bipolar transistor having a fourth first collector, a fourth first base, and a fourth first emitter occupying a fourth first emitter area;

wherein the first first base is coupled to the first second emitter;

wherein the first second base is coupled to the first third base;

wherein the first third emitter is coupled to the second first emitter;

wherein the second first base is coupled to the second second emitter;

wherein the second second base is coupled to the second third base;

wherein the second third emitter is coupled to the third third emitter;

wherein the third third base is coupled to the third second base;

wherein the third second emitter is coupled to the third first base;

wherein the third first emitter is coupled to the fourth third emitter;

wherein the fourth third base is coupled to the fourth second base; and wherein the fourth second emitter is coupled to the fourth first base.

2. A current multiplier as in claim 1, wherein an inverse of the first first emitter area plus an inverse of the first second emitter area equals an inverse of the first third emitter area;

wherein an inverse of the second first emitter area plus an inverse of the second second emitter area equals an inverse of the second third emitter area;

wherein an inverse of the third first emitter area plus an inverse of the third second emitter area equals an inverse of the third third emitter area; and wherein an inverse of the fourth first emitter area plus an inverse of the fourth second emitter area equals an inverse of the fourth third emitter area.

3. A current multiplier as in claim 1, wherein the first first emitter area and the first second emitter area are each twice the first third emitter area;

wherein the second first emitter area and the second second emitter area are each twice the second third emitter area;

wherein the third first emitter area and the third second emitter area are each twice the third third emitter area; and wherein the fourth first emitter area and the fourth second emitter area are each twice the fourth third emitter area.

4. A current multiplier as in claim 3, wherein the first third emitter area, the second third emitter area, the third third emitter area, and the fourth third emitter area are equal.

5. A current multiplier, comprising:

a first first bipolar transistor having a first first collector, a first first base, and a first first emitter occupying a first first emitter area;

a first second bipolar transistor having a first second collector, a first second base, and a first second emitter occupying a first second emitter area;

a first third bipolar transistor having a first third collector, a first third base, and a first third emitter occupying a first third emitter area;

a second first bipolar transistor having a second first collector, a second first base, and a second first emitter occupying a second first emitter area;

a second second bipolar transistor having a second second collector, a second second base, and a second second emitter occupying a second second emitter area;

a second third bipolar transistor having a second third collector, a second third base, and a second third emitter occupying a second third emitter area;

a third third bipolar transistor having a third third collector, a third third base, and a third third emitter occupying a third third emitter area;

a third second bipolar transistor having a third second collector, a third second base, and a third second emitter occupying a third second emitter area;

a third first bipolar transistor having a third first collector, a third first base, and a third first emitter occupying a third first emitter area;

a fourth third bipolar transistor having a fourth third collector, a fourth third base, and a fourth third emitter occupying a fourth third emitter area;

a fourth second bipolar transistor having a fourth second collector, a fourth second base, and a fourth second emitter occupying a fourth second emitter area; and a fourth first bipolar transistor having a fourth first collector, a fourth first base, and a fourth first emitter occupying a fourth first emitter area;

wherein the first first base is coupled to the first first collector and the first second emitter;

wherein the first second base is coupled to the second first emitter;

wherein the second first base is coupled to the second first collector and the second second emitter;

wherein the second second base is coupled to the third third emitter;

wherein the third third base is coupled to the fourth third emitter;

wherein the fourth third base is coupled to the first third base;

wherein the first third emitter is coupled to the second third base;

wherein the second third emitter is coupled to the third second base;

wherein the third second emitter is coupled to the third first collector and the third first base;

wherein the third first emitter is coupled to the fourth second base; and wherein the fourth second emitter is coupled to the fourth first collector and the fourth first base.

6. A current multiplier as in claim 5, wherein an inverse of the first first emitter area plus an inverse of the first second emitter area equals an inverse of the first third emitter area;

wherein an inverse of the second first emitter area plus an inverse of the second second emitter area equals an inverse of the second third emitter area;

wherein an inverse of the third first emitter area plus an inverse of the third second emitter area equals an inverse of the third third emitter area; and wherein an inverse of the fourth first emitter area plus an inverse of the fourth second emitter area equals an inverse of the fourth third emitter area.

7. A current multiplier as in claim 5, wherein the first first emitter area and the first second emitter area are each twice the first third emitter area;

wherein the second first emitter area and the second second emitter area are each twice the second third emitter area;

wherein the third first emitter area and the third second emitter area are each twice the third third emitter area; and wherein the fourth first emitter area and the fourth second emitter area are each twice the fourth third emitter area.

8. A current multiplier as in claim 7, wherein the first third emitter area, the second third emitter area, the third third emitter area, and the fourth third emitter area are equal.

* * * * *